(12) United States Patent
Zheng et al.

(10) Patent No.: US 9,042,619 B2
(45) Date of Patent: May 26, 2015

(54) METHOD AND SYSTEM FOR AUTOMATIC NATIVE AND BYPASS CORONARY OSTIA DETECTION IN CARDIAC COMPUTED TOMOGRAPHY VOLUMES

(75) Inventors: Yefeng Zheng, Dayton, NJ (US); Fernando Vega-Higuera, Erlangen (DE); Shaohua Kevin Zhou, Plainsboro, NJ (US); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 813 days.

(21) Appl. No.: 13/233,220

(22) Filed: Sep. 15, 2011

(65) Prior Publication Data

US 2012/0071755 A1 Mar. 22, 2012

Related U.S. Application Data

(60) Provisional application No. 61/383,473, filed on Sep. 16, 2010.

(51) Int. Cl.
| | |
|---|---|
| *G06K 9/00* | (2006.01) |
| *G06K 9/62* | (2006.01) |
| *G06K 9/34* | (2006.01) |
| *G06T 7/00* | (2006.01) |

(52) U.S. Cl.
CPC .............. *G06T 7/0081* (2013.01); *G06T 7/0083* (2013.01); *G06T 2207/10072* (2013.01); *G06T 2207/30048* (2013.01); *G06T 2207/30101* (2013.01); *G06T 2207/30172* (2013.01)

(58) Field of Classification Search
CPC ........... G06T 2207/30048; G06T 2207/10081; G06T 2207/30101; G06T 7/0083; G06T 7/0079

USPC ................... 382/154, 131, 173, 155
See application file for complete search history.

(56) References Cited

U.S. PATENT DOCUMENTS

| | | | | |
|---|---|---|---|---|
| 7,916,919 | B2 * | 3/2011 | Zheng et al. .................. | 382/131 |
| 8,675,943 | B2 * | 3/2014 | Zheng et al. .................. | 382/131 |
| 2006/0251325 | A1 * | 11/2006 | Florin et al. .................. | 382/173 |
| 2007/0058849 | A1 | 3/2007 | Lorenz | |

(Continued)

OTHER PUBLICATIONS

Zheng, Yefeng, et al. "Automatic aorta segmentation and valve landmark detection in C-arm CT: application to aortic valve implantation." Medical Image Computing and Computer-Assisted Intervention—MICCAI 2010. Springer Berlin Heidelberg, 2010. 476-483.*

(Continued)

*Primary Examiner* — Utpal Shah

(57) ABSTRACT

A method and system for detection of native and bypass coronary ostia in a 3D volume, such as a CT volume, is disclosed. Native coronary ostia are detected by detecting a bounding box defining locations of a left native coronary ostium and a right native coronary ostium in the 3D volume using marginal space learning (MSL), and locally refining the locations of the left native coronary ostium and the right native coronary ostium using a trained native coronary ostium detector. Bypass coronary ostia are detected by segmenting an ascending aorta surface mesh in the 3D volume, generating a search region of a plurality of mesh points on the ascending aorta surface mesh based on a distribution of annotated bypass coronary ostia in a plurality of training volumes, and detecting the bypass coronary ostia by searching the plurality of mesh points in the search region.

55 Claims, 10 Drawing Sheets

(56) References Cited

U.S. PATENT DOCUMENTS

| | | |
|---|---|---|
| 2007/0116345 A1 | 5/2007 | Peterson et al. |
| 2008/0033302 A1* | 2/2008 | Grady et al. ............ 600/481 |
| 2008/0101676 A1* | 5/2008 | Zheng et al. ............ 382/131 |
| 2009/0136107 A1 | 5/2009 | Arnold et al. |
| 2010/0239148 A1* | 9/2010 | Zheng et al. ............ 382/131 |
| 2011/0096964 A1 | 4/2011 | Zheng et al. |
| 2011/0222750 A1* | 9/2011 | Liao et al. ............ 382/131 |

OTHER PUBLICATIONS

Yefeng Zheng; Barbu, A.; Georgescu, B.; Scheuering, M.; Comaniciu, D., "Four-Chamber Heart Modeling and Automatic Segmentation for 3-D Cardiac CT Volumes Using Marginal Space Learning and Steerable Features," Medical Imaging, IEEE Transactions on, vol. 27, No. 11, pp. 1668,1681, Nov. 2008.*

* cited by examiner

METHOD AND SYSTEM FOR AUTOMATIC NATIVE AND BYPASS CORONARY OSTIA DETECTION IN CARDIAC COMPUTED TOMOGRAPHY VOLUMES

This application claims the benefit of U.S. Provisional Application No. 61/383,473, filed Sep. 16, 2010, the disclosure of which is herein incorporated by reference.

BACKGROUND OF THE INVENTION

The present invention relates to medical imaging of the heart, and more particularly, to automatic detection of native and bypass coronary ostia in cardiac computed tomography (CT) volumes.

According to statistics from the United States Center for Disease Control and Prevention, cardiovascular disease (CVD) is the leading cause of death in the United States. Coronary artery disease (CAD) is among the most common types of CVD. CAD is often caused by the narrowing of the coronary artery (or atherosclerosis), which lead to coronary artery stenosis and can cause heart attack, angina, or both. Coronary artery bypass surgery is a well established surgical procedure to improve the blood supply to the coronary circulation supplying the myocardium when coronary artery stenosis is too severe and medical therapy does not help. In coronary artery bypass surgery, arteries or veins from elsewhere in the patient's body are grafted to the coronary arteries to bypass atherosclerotic narrowings. Typically, one end of the graft is sewn onto to a coronary artery beyond the blockages and the other is attached to the ascending aorta. Alternatively, the distal end of the left internal thoracic artery (LITA) can be attached to the coronary artery with its proximal end connected to the subclavian artery.

Many techniques have been developed for imaging the heart to diagnose CAD, including computed tomography (CT), magnetic resonance imaging (MRI), fluoroscopic angiography, etc. Compared to MRI, CT provides superior space resolution (especially between image slices) and high temporary resolution. Using recently developed technology for CT scanning, it is possible to scan the entire heart in one heart beat, thus minimizing motion artifacts. Compared to fluoroscopic angiography, CT is a non-invasive imaging technique, and therefore reduces the risk and complications associated with the minimal surgery associated with fluoroscopic angiography. In order to facilitate diagnosis of CAD, it is desirable to develop a system that can efficiently and effectively extract the coronary artery centerlines from a cardiac CT volume. Using the extracted coronary artery centerlines, a curved multi-planar reformation (curved MPR) image can be generated to give a physician an overview of the entire coronary artery. Lumen segmentation can further provide quantification of coronary stenosis.

Many coronary artery centerline extraction algorithms utilize a vessel tracing method to trace an artery, starting from the aortic root. The coronary ostia are often used to initialize such vessel tracing methods. Although earlier methods required a user to specify the coronary ostia in order to initialize the tracing method, various automatic seeding methods have been proposed to initiate the coronary artery centerline extraction. For example, various automatic or semiautomatic coronary ostia detection methods have been proposed. Conventional methods for detecting the coronary ostia typically need to segment the aorta before detecting the coronary ostia. Such conventional methods are not robust under imaging artifacts and severe obstruction of the coronary around the ostia. Furthermore, conventional coronary ostia detection methods typically perform poorly for detecting bypass coronary ostia.

BRIEF SUMMARY OF THE INVENTION

The present invention provides a method and system for automatically detecting native and bypass coronary ostia in 3D medical images, such as cardiac computed tomography (CT) volumes. Embodiments of the present invention automatically detect the native coronary ostia without first segmenting the aorta. Embodiments of the present invention detect bypass coronary ostia by constraining a search for the bypass coronary ostia to an anterior part of the surface of the ascending aorta surface.

In one embodiment of the present invention, a bounding box defining locations of a left native coronary ostium and a right native coronary ostium is detected in a 3D volume using marginal space learning (MSL). The locations of the left native coronary ostium and the right native coronary ostium are locally refined using a trained native coronary ostium detector. Bypass coronary ostia may be detected by segmenting an ascending aorta surface mesh in the 3D volume and detecting one or more bypass coronary ostia in the 3D volume based on the segmented ascending aorta surface mesh.

In another embodiment of the present invention, an ascending aorta surface mesh is segmented in the 3D volume. A search region including a plurality of mesh points of the ascending aorta surface mesh is generated based on a distribution of annotated bypass coronary ostia in a plurality of training volumes. One or more bypass coronary ostia are detected in the 3D volume by searching the plurality of mesh points in the search region.

These and other advantages of the invention will be apparent to those of ordinary skill in the art by reference to the following detailed description and the accompanying drawings.

DETAILED DESCRIPTION

The present invention is directed to a method and system for automatic native and bypass coronary ostia detection in medical images, such as CT volumes and magnetic resonance (MR) image volumes. Embodiments of the present invention are described herein to give a visual understanding of the coronary ostia detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention provide a system and method for automatic detection of native and bypass coronary ostia using machine learning based methods. There is strong prior for locations of the native coronary ostia, e.g., the coronary ostia originate on the left and right cusps of the aortic valve. Embodiments of the present invention utilize the strong spatial relationships to the surrounding tissues in order to detect the native coronary ostia without first segmenting the aorta, as done in conventional methods. Detecting the native coronary ostia directly saves valuable computation power and time. Embodiments of the present invention utilize marginal space learning (MSL) to detect the native coronary ostia.

Figure 1:
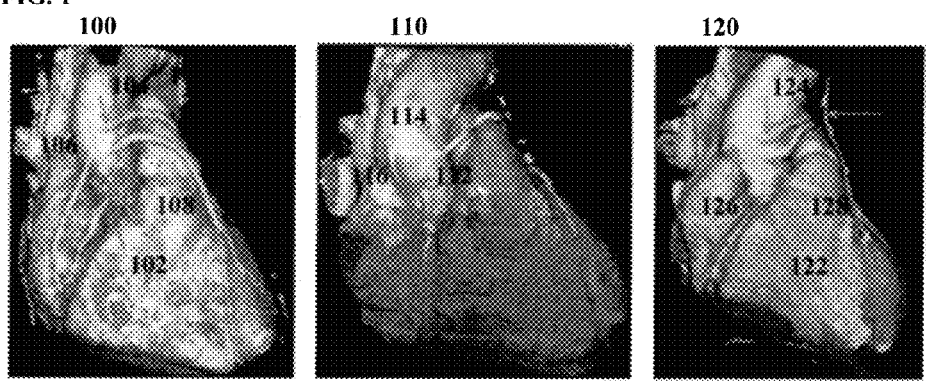
FIG. 1 illustrates 3D volume visualizations of coronary arteries and coronary ostia.

FIG. 1 illustrates 3D volume visualizations of the coronary arteries and the ostia. Image 100 of FIG. 1 shows the right native coronary ostium 102 and bypass coronary ostia 104, 106, and 108. Image 110 of FIG. 1 shows the right native coronary ostium 112 and bypass coronary ostia 114 and 116. Image 120 of FIG. 1 shows the right native coronary ostia 122 and bypass coronary ostia 124, 126, and 128.

As shown in FIG. 1, there as less constraints on the exact position of the bypass coronary ostia, as compared with the native coronary ostia. The number of bypass coronaries may vary, for example from one bypass up to four. One constraint is that the bypass coronary ostia originate from the ascending aorta surface. Embodiments of the present invention first segment the ascending aorta and then constrain the search for the bypass coronary ostia to the ascending aorta surface. After segmentation, the aorta surface can be uniformly resampled (e.g., at 1 mm resolution) to generate a set of points. A trained classifier is then used to classify each point to be a bypass ostium or not. The bypass ostia are always on the anterior part of the aorta. This is because if the bypass is grafted on the posterior of the aorta, the bypass would need to wind around the aorta to attach to the heart surface, which introduces unnecessary risk caused by the pressure of the aorta. Using such prior knowledge, which can be learned from a training set, approximately 80% of the aorta surface can be excluded from a search region for the bypass ostia. All ascending aorta mesh points with a classification score larger than a threshold can be kept, followed by connected component analysis on the mesh. Large clusters are selected as bypass ostia. Embodiments of the present invention achieve a high detection rate (>95%) with a low false positive rate (approximately 0.2 false positives/volume), and are extremely computationally efficient. For example, in one implementation, the automatic coronary ostia detection method takes about 0.3 seconds to process one CT volume.

Figure 2:
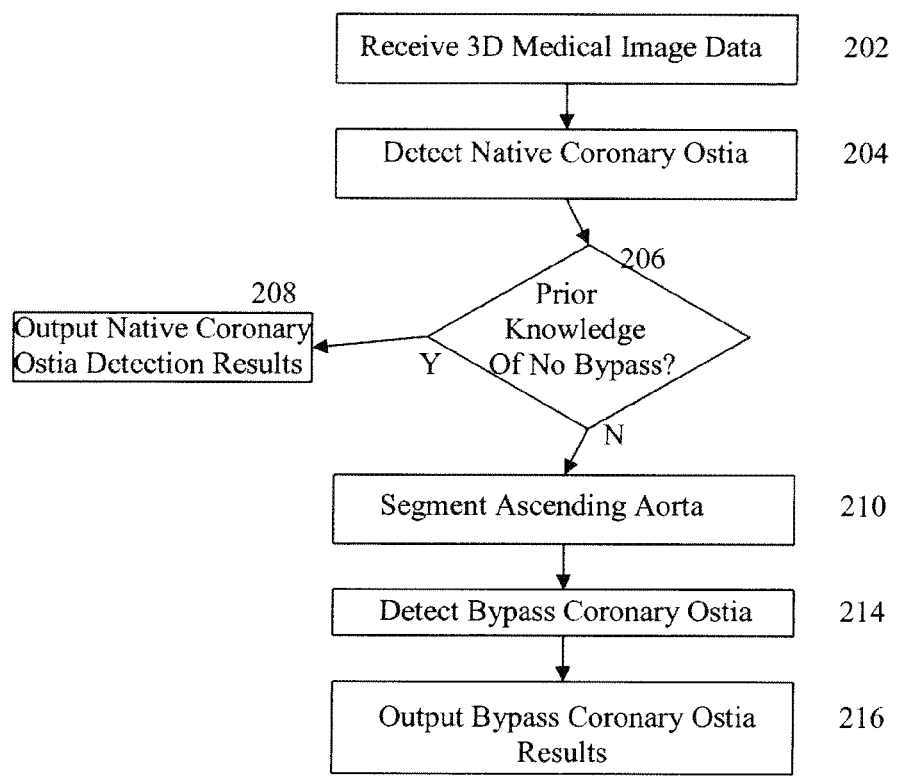
FIG. 2 illustrates a method of native and bypass coronary ostia detection according to an embodiment of the present invention.

FIG. 2 illustrates a method of native and bypass coronary ostia detection according to an embodiment of the present invention. As illustrated in FIG. 2, at step 202, 3D medical image data (a 3D volume) is received. For example, the 3D medical image data can be a cardiac CT volume or an MR volume. Although the method is described herein as detecting the coronary ostia in a cardiac CT volume, the present invention is not limited thereto and may be applied to other imaging modalities as well. The 3D medical image data may be received from an image acquisition device, such as a CT scanner. The 3D medical image data may also be received by loading 3D medical image data previously stored, for example, in a memory or storage of a computer system.

Figure 3:
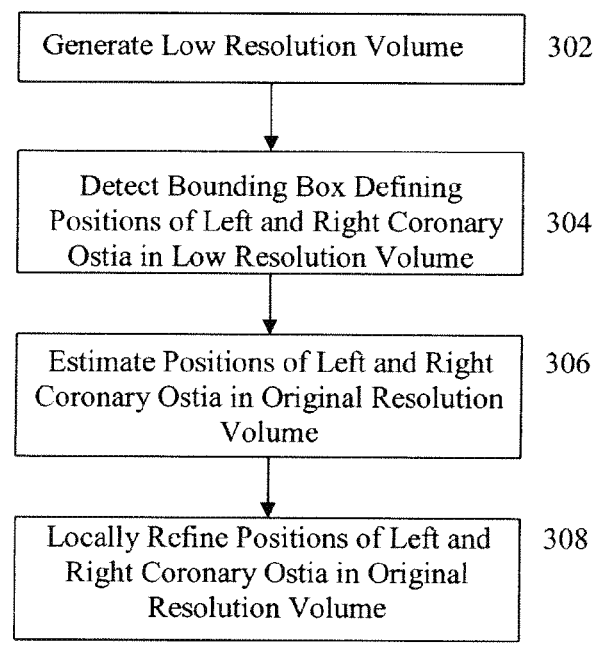
FIG. 3 illustrates a method for automatic native coronary ostia detection according to an embodiment of the present invention.

At step 204, the native coronary ostia are detected in the 3D medical image data. There is a strong constraint on the position of the native coronary ostia. The left and right native coronary ostia should be present on opposite sides of the aortic root. Therefore, according to an advantageous embodiment of the present invention, it is not necessary to segment the aorta prior to native coronary ostia detection. FIG. 3 illustrates a method for automatic native coronary ostia detection according to an embodiment of the present invention. The method of FIG. 3 can be used to implement step 204 of FIG. 2.

As illustrated in FIG. 3, at step 302, a low resolution volume is generated from the received 3D medical image. For example, an input anisotropic CT volume can be converted to isotropic 3 mm low resolution. At this resolution, a typical volume size can be reduced from approximately 512×512×200 voxels to 64×64×64 voxels.

Figure 4:
FIG. 4 illustrates a bounding box defining the positions of the left and right native coronary ostia.

At step 304, a bounding box defining positions of the left and right native coronary ostia is detected in the low resolution volume using marginal space learning (MSL). It can be noted, that it is also possible that the bounding box be directly detected in the original high resolution volume, but the use of the low resolution volume is effective and saves computational resources. FIG. 4 illustrates a bounding box defining the positions of the left and right native coronary ostia. As illustrated in FIG. 4, the bounding box 400 is defined as a cube with a side aligned with the direction connecting the left native coronary ostia 402 and the right native coronary ostia 404, with the left and right native coronary ostia 402 and 404 located at the center of two opposite faces of the cube.

MSL is used estimate the position, orientation, and scale of the bounding box in the low resolution volume using a series of detectors trained using annotated training data. MSL has recently been developed to apply learning based techniques for 3D object detection. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The 3D object (e.g., the bounding box) detection is split into three steps: object position estimation, position-orientation estimation, and position-orientation-scale estimation. A separate classifier is trained based on annotated training data for each of these steps. This object localization stage results in an estimated transformation (position, orientation, and scale) of the object, and a mean shape of the object (i.e., the mean shape of the bounding box in the training data) is aligned with the 3D volume using the estimated transformation.

Returning to FIG. 3, at step 306, positions of the left and right native coronary ostia are estimated in the original high-resolution volume based on the bounding box detected in the low resolution volume. The detected bounding box provides a position for each of the native coronary ostia in the low resolution volume, and these positions are applied to the original high resolution volume by mapping the bounding box to the original high resolution volume, resulting in estimates for the positions of the left and right native coronary ostia in the original high resolution volume.

At step 308, the positions of the left and right native coronary ostia are refined locally in the original high resolution volume. The local refinement is performed using a local detector, which is trained to distinguish a true ostium from surrounding tissue using image features. The input volume may be anisotropic with different in-slice and between-slice resolutions. The resolution setting may also vary from volume to volume. Many image features (e.g., Haar wavelet features) require normalizing the volume to a common resolution. They often also require rotation of the volume to normalize the object (the aortic root in this case) orientation to a standard setting to reduce variation. In order to avoid such time consuming volume operations, embodiments of the present invention utilize steerable features, which are very efficient for handling variations in the volume resolution and object orientation. According to a possible implementation, a regular sampling pattern with 5×5×5 sampling points can be used for training the local detector and detection using the trained detector. The distance between neighboring sampling points can be set to 3 mm, and the sampling pattern is aligned with the orientation of the coronary ostia cube (bounding box) estimated in step 304. A probabilistic boosting tree (PBT) can be used to train the local detector, but the present invention is not limited thereto and other classifiers can also be used for this classification purpose. Two local detectors are trained, one for the left coronary ostium and one for the right coronary ostium.

Using the local detector, each voxel within a certain range of the initial estimated ostium position is classified. For example, each voxel within a 20 mm cube centered at the initial estimated ostium position can be classified with the local detector. In one possible implementation, the voxel with the largest detection score (from the local detector) is selected as the final result for the ostium position. In another possible embodiment, a certain number of voxels (e.g., 20) with the highest detection scores can be selected, and the average position of the voxels with the highest detection scores can be used as the final result for the ostium position.

Returning to FIG. 2, at step 206, it is determined if there is prior knowledge that no bypass exists. If there is prior knowledge that no bypass exists, the method proceeds to step 208. If there is not prior knowledge that no bypass exists, the method proceeds to step 210. At step 208, if there is prior knowledge that no bypass exists, the native coronary ostia detection results are output. For example, the native coronary ostia results can be output by displaying the native coronary ostia detection results on a display of a computer system or by storing the native coronary ostia detection results on a memory or storage of a computer system.

At step 210, the ascending aorta is segmented in the 3D medical image data. In one embodiment, the ascending aorta can be segmented based in part on the detected native coronary ostia. The bypass coronary arteries are attached onto the ascending aorta. According to an embodiment of the present invention, it is advantageous to reduce detection errors by constraining the searching of the bypass ostia to the surface of the ascending aorta. Region growing can be used to segment the ascending aorta, and may be sufficient. However, some patients have strong residual contrast inside the right atrium (RA), especially inside the RA appendage that is very close to the aorta. Due to imaging artifacts, such as motion artifacts, streak artifacts, etc., region growing may leak into the RA appendage. As another issue, the bypass arteries and left ventricles are often included in the mask resulting from region growing. Previously, heuristic methods have been proposed to exclude these extra structures. In an advantageous embodiment of the present invention, a machine learning method can be used to segment the ascending aorta.

Figure 5:
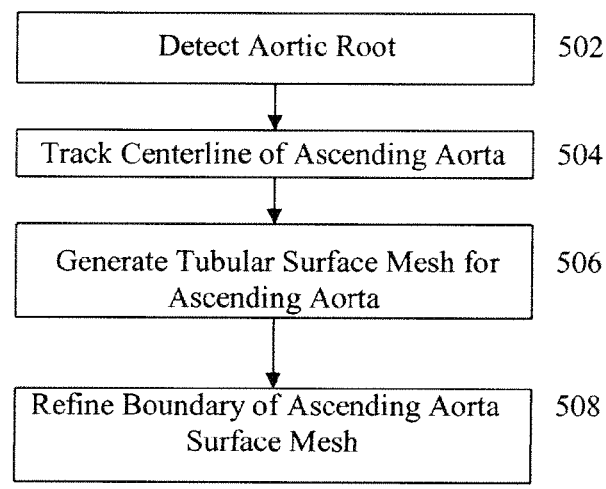
FIG. 5 illustrates a method of segmenting the ascending aorta according to an embodiment of the present invention.

FIG. 5 illustrates a method of segmenting the ascending aorta according to an embodiment of the present invention. The method of FIG. 5 is similar to the method for the aorta segmentation method described in United States Published Patent Application No. 2010/0239148, which is incorporated herein by reference. However, in the method of FIG. 5, it is not necessary to segment the entire aorta. The method of FIG. 5 may be used to implement step 210 of FIG. 2.

Referring to FIG. 5, at step 502, the aortic root is detected in the 3D medical image data. The aortic root may be detected based on the native coronary ostia detected in step 204 of FIG. 2. In particular, the left and right native coronary ostia are present on opposite sides of the aortic root. Accordingly, the detected left and right native coronary ostia (and the corresponding bounding box that fits to the detected left and right native coronary ostia) give an accurate estimate of the position, orientation, and size of the aortic root. Therefore, in an advantageous embodiment no further search for the aortic root is required. If the positions of the native coronary ostia are not available, the aortic root may also be detected using MSL, as described in United States Published Patent Application No. 2010/0239148.

At step 504, the centerline of the ascending aorta is tracked from the aortic root in the 3D volume. The length of the visible ascending aorta varies significantly from volume to volume. Instead of truncating them to the same length, a tracking method can be used deal with this variation. In a CT volume, the orientation of the ascending and descending aorta (after excluding the root and the arch) aligns quite well with the normal of the imaging plane. This means that on an image slice, the intersection of the ascending aorta is in the approximate shape of a circle. According to an embodiment of the present invention, a 2D circle detector is trained based on annotated training data to detect the circular intersection of the ascending aorta with a 2D slice. According to an advantageous implementation, the 2D circle detector can be trained using Haar wavelet features. The tracking of the ascending aorta starts from the aortic root and is performed slice by slice, moving upwards towards a patient's head. For each slice, the trained circle detector is used to attempt to detect an aortic circle on that slice. For an imaging slice containing the ascending aorta, the 2D circle detector may fire up multiple times around the true position of the aortic circle. The detected circle that is closest to the circle detected on the previous slice is selected, and the tracking method moves to the next slice. It is to be understood that the initial circle on the initial slice corresponds to an uppermost portion of the aortic root. The ascending aorta is tracked upwards from the aortic root and the tracking procedure stops when it reaches the top border of the volume, when no aortic circle is detected in a slice, or when it reaches the aortic arch.

At step 506, a tubular mesh is generated for the ascending aorta. The tracking step results in the centerline of the ascending aorta. A tube is synthesized as an initial estimate of the shape for the ascending aorta. The radius of the tube can be set as the mean radius of the aorta calculated from the training volumes.

At step 508, the boundary of the ascending aorta mesh is refined. The initial estimate of the ascending aorta shape achieved from the tracking steps is close to the true aorta boundary; however, a perfect circle likely does not fit the boundary exactly. A learning based boundary detector is trained based on training data and used for final boundary delineation. A generic mesh smoothing technique can then be used to achieve a smooth surface for the segmented aorta. Accordingly, a two-step iterative approach can be used for boundary refinement. First, the learning-based boundary detector is used to adjust each mesh point along the surface normal to the optimal position where the response of the boundary detector is largest. Second, a mesh smoothing technique is used to smooth the resulting boundary. These two steps can be iterated to improve the boundary delineation accuracy.

Figure 6:
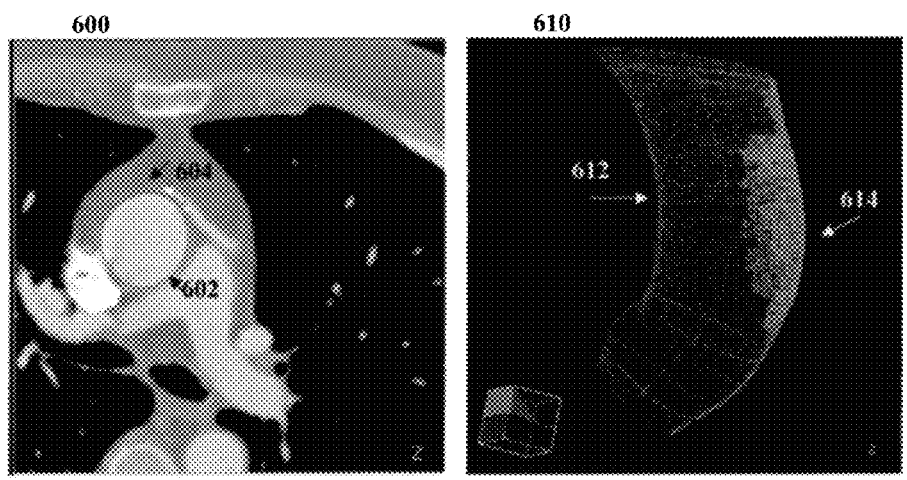
FIG. 6 illustrates a constrained search range of the bypass coronary ostia on the aorta surface.

Returning to FIG. 2, at step 212, the bypass coronary ostia are detected based on the segmented ascending aorta. A bypass coronary ostium is always grafted onto the anterior part of the aorta. If it were grafted onto the posterior part, the bypass artery would need to wind around the aorta to bring it to the heart surface, which would introduce unnecessary risk caused by the pressure of the aorta. Using such prior knowledge of the spatial distribution learned from a set of training data, it is possible to exclude a large portion of the aorta surface from a search for the bypass coronary ostia by constraining the search to particular search region on the ascending aorta mesh. FIG. 6 illustrates a constrained search range of the bypass coronary ostia on the aorta surface. As illustrated in FIG. 6, image 600 shows the aorta 602 and the priori distribution 604 of the bypass ostia learned from the training data. As shown in image 600, the priori distribution 604 of the bypass ostia is constrained to an anterior part of the aorta 602. Image 610 shows the ascending aorta mesh 612 and a search region 614 for the bypass coronary ostia corresponding to the prior distribution 604 of the bypass ostia learned from the training data. A search is performed on mesh points in the search region 614 to detect the bypass coronary ostia.

Figure 7:
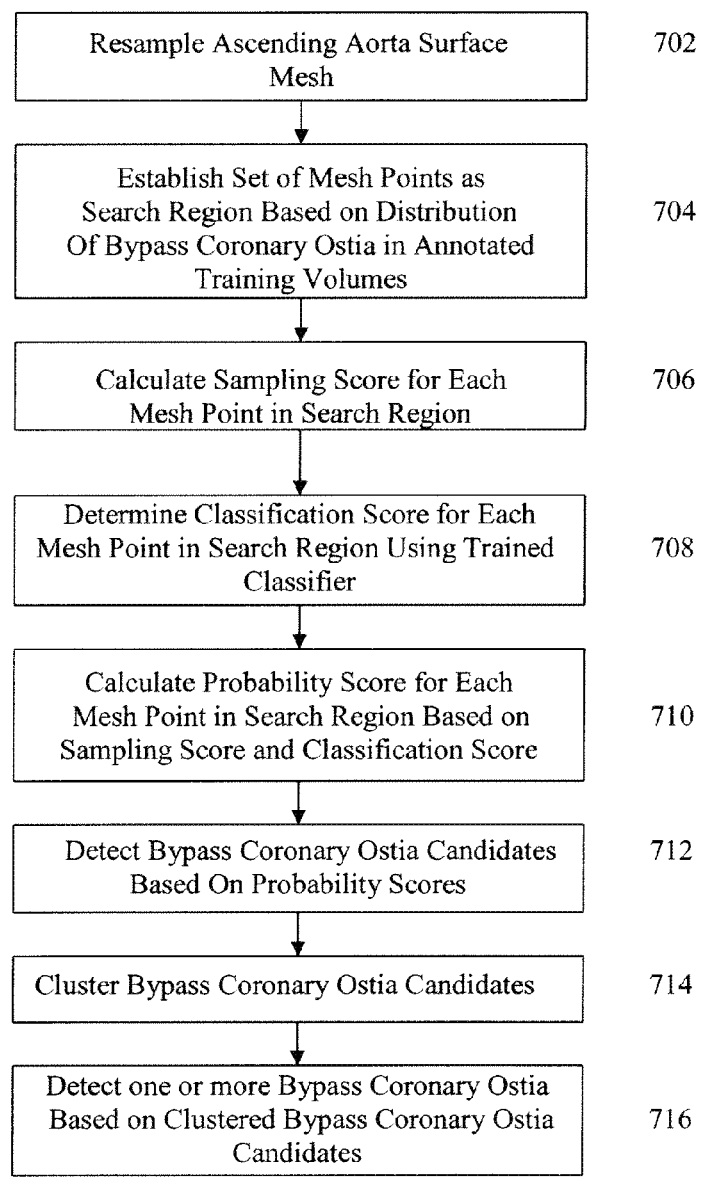
FIG. 7 illustrates a method of detecting bypass coronary ostia according to an embodiment of the present invention.

FIG. 7 illustrates a method of detecting bypass coronary ostia according to an embodiment of the present invention. The method of FIG. 7 can be used to implement step 212 of FIG. 2. As illustrated in FIG. 7, at step 702, the ascending aorta mesh is resampled to a predetermined resolution to establish mesh point correspondence. For example the ascending aorta mesh can be resampled to 1 mm in a circular way. The ordering of mesh points starts from the aortic root and extends to the aortic arch. Although the length of the captured aorta varies from volume to volume, after resampling, correspondence can be established for common mesh points across different volumes. This allows voxels in the training volumes to be consistently mapped to mesh points of the resampled ascending aorta mesh. In one advantageous implementation, at each resampled centerline point, the 2D intersection of the aorta mesh and the plane perpendicular to the centerline is calculated. The 2D intersection contour is close to an ellipse, which is then uniformly resampled to 96 points with a clock-wise ordering. To establish a consistent ordering of these 96 points, the point with the smallest x-coordinate position is selected as the first point. The number of sampling points (96 in this case) is selected such that the distance between neighboring resampled points is close 1 mm. Thus, the point correspondence of the 2D mesh intersection is established. After triangulating the resampled points into a surface mesh, good correspondence is established for the aorta mesh points across different volumes, therefore all meshes can be aligned into a common coordinate system.

At step 704, a set of mesh points of the resampled ascending aorta mesh is established as a search region based on the distribution of bypass coronary ostia in the annotated training volumes. Given a set of annotate training volumes with annotated bypass coronary ostia, the closest mesh point is determined for each bypass coronary ostia in the training volumes. This closet mesh point is labeled, together with its n-order neighborhood on the mesh. The neighborhood order, n, can be tuned to a large value if the training set is small (setting a loose constraint), or a small value for a large training set (setting a strong constraint). In one possible implementation, a second-order neighborhood is used. If a mesh point corresponds to an annotated bypass coronary ostium in the training data or is within the n-order neighborhood, a hit count for that mesh point is increased by one. After processing all training datasets, the search region is generated as the set of mesh points with at least one hit, as shown by search region 614 in image 610 of FIG. 6. All mesh points without any hits are excluded during bypass ostia detection.

At step 706, a sampling score is calculated for each mesh point in the search region. The sampling score measures the relative likelihood of a bypass ostium being located at each mesh point based on the training data. In particular, an estimate of the priori distribution of the bypass coronary ostia $P_0(i)$ at ascending aorta mesh point i is calculated as:

$$P_0(i) = \frac{\text{\# Hits at mesh point } i}{\text{\# Training Volumes}} \tag{1}$$

The sampling score for each mesh point i is calculated by normalizing the prior probability, and can be expressed as:

$$\hat{P}_0(i) = \frac{P_0(i)}{\max_i P_0(i)}, \tag{2}$$

which measures the relative likelihood of a bypass ostium being located at mesh point i.

At step 708, a classification score is determined for each mesh point in the search region using a trained classifier. In particular, a classifier is trained based on the training data to classify each point as a bypass ostium or not. According to one implementation, to handle the variation in volume resolution and aorta surface orientation, efficient scalable features can be used by the classifier. Regular sampling can be used with one sampling axis aligned with the aorta surface normal at the current point being classified. A PBT can be used for classification. The trained classifier outputs a classification score C(i) (in the range of [0.1], the higher the score, the more confident that the point is a bypass ostium) at each mesh point i.

At step 710, a probability score is calculated for each mesh point in the search range based on the sampling score and the classification score. The probability score is the posterior probability that a bypass ostium is located at a mesh point i, and is defined as:

$$P(i|V) = \hat{P}_0(i)C(i|V). \tag{3}$$

Here, V is the input volume.

At step 712, bypass coronary ostia candidates are detected based on the probability scores of the mesh points. In particular, mesh points with a probability score larger than a threshold value (e.g., 0.5) are selected as bypass coronary ostia candidates. At step 714, the candidate mesh points are clustered using a connected component analysis. Connected component analysis is performed on the ascending aorta surface mesh for the detected bypass coronary ostia candidates in order to cluster multiple detections for the same bypass coronary ostia. At step 716, one or more bypass coronary ostia are detected based on the clustered bypass coronary ostia candidates. In particular, large clusters having above a certain number of clustered bypass coronary ostia candidates are selected as the detected bypass coronary ostia. In one possible implementation, the largest clusters having no less than four clustered bypass coronary ostia candidates are selected as bypass coronary ostia locations. Typically, there are not more than four bypass coronary ostia in a single volume.

The method for detecting bypass coronary ostia described above can achieve a high detection rate (e.g., 95%) with a low false positive rate (e.g., 0.2 false positives/volume). Additional validation, such as tracing the coronary centerlines from the detected bypass coronary ostia locations, may further improve the detection accuracy.

Returning to FIG. 2, at step 214, the bypass coronary ostia detection results are output. For example, the native coronary ostia results can be output by displaying the native coronary ostia detection results on a display of a computer system or by storing the native coronary ostia detection results on a memory or storage of a computer system.

Figure 8:
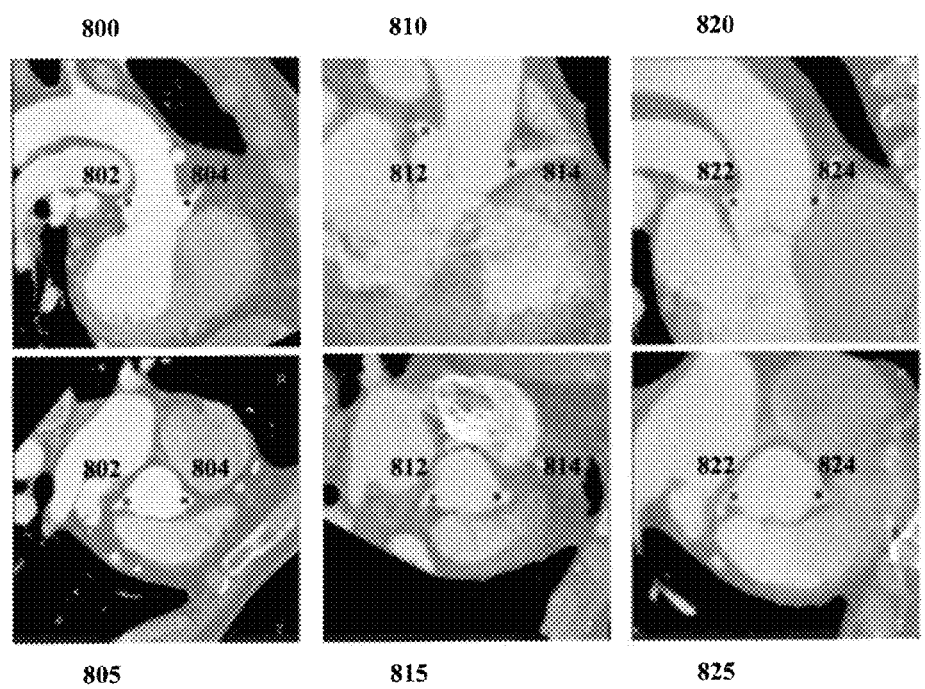
FIG. 8 illustrates exemplary detection results for native coronary ostia.

FIG. 8 illustrates exemplary detection results for native coronary ostia using the above described methods. As illustrated in FIG. 8, image 800 shows a left native coronary ostium 802 and a right native coronary ostium 804 in a cranial view of the aortic valve in a first CT volume, and image 805 shows left and right native coronary ostia 802 and 804 in the corresponding transverse view of the first CT volume. Image 810 shows a left native coronary ostium 812 and a right native coronary ostium 814 in a cranial view of the aortic valve in a second CT volume, and image 815 shows left and right native coronary ostia 812 and 814 in the corresponding transverse view of the second CT volume. Image 820 shows a left native coronary ostium 822 and a right native coronary ostium 824 in a cranial view of the aortic valve in a third CT volume, and image 825 shows left and right native coronary ostia 822 and 824 in the corresponding transverse view of the third CT volume.

Figure 9:
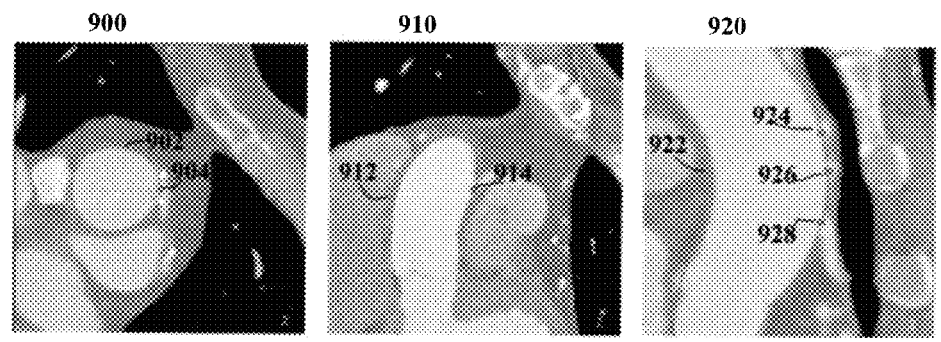
FIG. 9 illustrates exemplary detection results for bypass coronary ostia.

FIG. 9 illustrates exemplary detection results for bypass coronary ostia using the above described methods. As illustrated in FIG. 9, image 900 shows the segmented ascending aorta 902 and a detected bypass coronary ostium 904. Image 910 shows the segmented ascending aorta 912 and a detected bypass coronary ostium 914. Image 920 shows the segmented ascending aorta 922 and detected bypass coronary ostia 924, 926, and 928.

Figure 10:
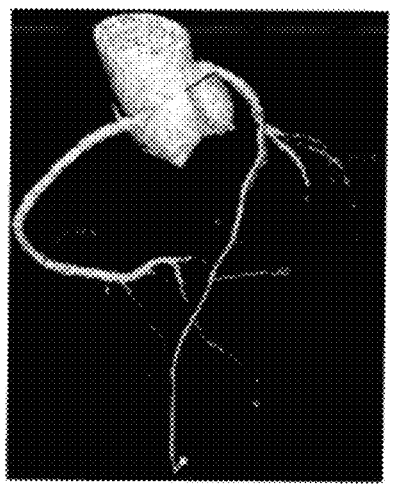
FIG. 10 illustrates an example of a coronary tree automatically traced starting from automatically detected native coronary ostia.

The locations of the native and bypass coronary ostia detected using the above described methods may be used to initialize various coronary artery tracing algorithms. FIG. 10 illustrates an example of a coronary tree automatically traced starting from native coronary ostia detected using the above described methods.

It can be noted that the above described methods for detecting bypass coronary ostia focus on the detection of the bypass ostia attached to the aorta. The in-situ graft using the left/right internal thoracic artery (LITA/RITA) is not considered since it requires a much larger scanning range to image the original LITA/RITA ostia attached to the subclavian artery. To minimize the radiation dose, the standard cardiac CT scanning protocol does not cover the LITA/RITA ostia. However, due to the consistency in the position of the LITA/RITA ostia, the method described above for detection of native coronary ostia can be extended to detect the LITA/RITA ostia if they are captured in the cardiac CT volume.

Figure 11:
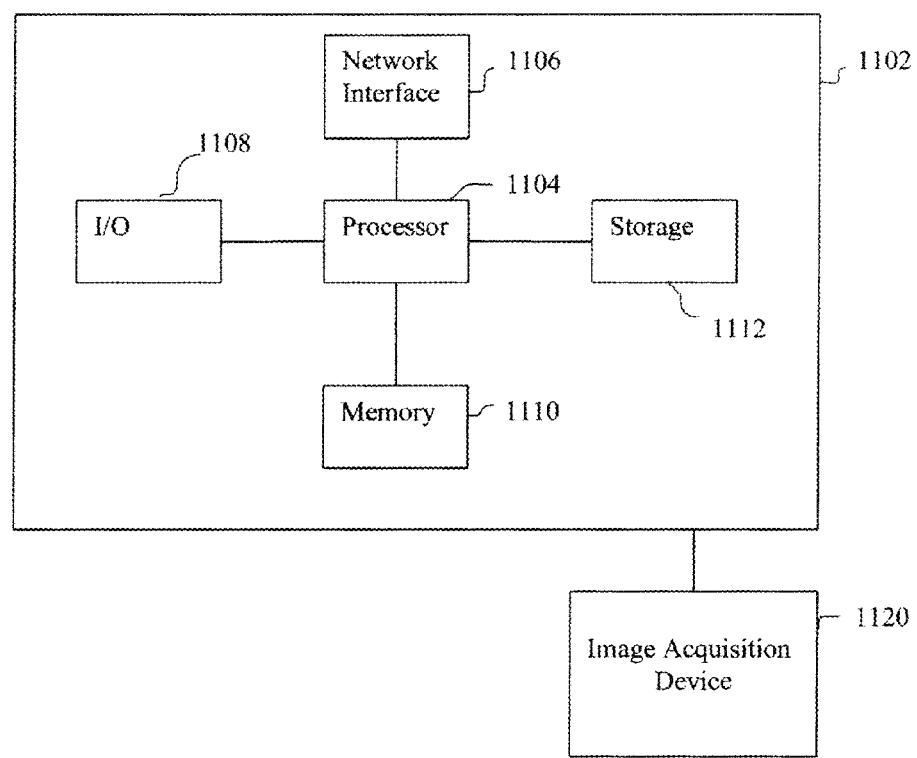
FIG. 11 is a high level block diagram of a computer capable of implementing the present invention.

The above-described methods for automatic native and bypass coronary ostia detection in a 3D volume, such as a CT volume, may be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112, or other computer readable medium (e.g., magnetic disk, CD ROM, etc.) and loaded into memory 1110 when execution of the computer program instructions is desired. Thus, the steps of the methods of FIGS. 2, 3, 5 and 7 may be defined by the computer program instructions stored in the memory 1110 and/or storage 1112 and controlled by the processor 1104 executing the computer program instructions. An image acquisition device 1120, such as a CT scanner, can be connected to the computer 1102 to input images to the computer 1102. It is possible to implement the image acquisition device 1120 and the computer 1102 as one device. It is also possible that the image acquisition device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.). One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting coronary ostia in a 3D volume, comprising:
   detecting a bounding box defining locations of a left native coronary ostium and a right native coronary ostium in the 3D volume using marginal space learning (MSL); and
   locally refining the location of each of the left native coronary ostium and the right native coronary ostium using a trained native coronary ostium detector.

2. The method of claim 1, wherein the 3D volume is a CT volume.

3. The method of claim 1, wherein the bounding box comprises a cube having a side aligned with a direction connecting the left and right native coronary ostia, with the left and right native coronary ostia located at the center of opposite faces of the cube.

4. The method of claim 1, wherein the step of detecting a bounding box defining locations of a left native coronary ostium and a right native coronary ostium in the 3D volume using marginal space learning (MSL) comprises:
   generating a low-resolution volume from the 3D volume;
   detecting the bounding box in the low-resolution 3D volume; and mapping the detected bounding box back to the 3D volume at an original resolution of the 3D volume to estimate the locations of the left native coronary ostium and the right native coronary ostium in the 3D volume.

5. The method of claim 4, wherein the step of locally refining the location of each of the left native coronary ostium and the right native coronary ostium using a trained native coronary ostium detector comprises:
locally refining the estimated locations of the left native coronary ostium and the right native coronary ostium in the 3D volume at the original resolution using the trained native coronary ostium detector.

6. The method of claim 1 wherein the step of detecting a bounding box defining locations of a left native coronary ostium and a right native coronary ostium in the 3D volume using marginal space learning (MSL) comprises:
detecting a position, orientation, and scale of the bounding box in the 3D volume using a trained position classifier, a trained position-orientation classifier, and a trained position-orientation-scale classifier.

7. The method of claim 1, wherein the step of locally refining the location of each of the left native coronary ostium and the right native coronary ostium using a trained native coronary ostium detector comprises:
locally refining the location of the left native coronary ostium in the 3D volume using a trained left native coronary ostium detector; and
locally refining the location of the right native coronary ostium in the 3D volume using a trained right native coronary ostium detector.

8. The method of claim 1, wherein the step of locally refining the location of each of the left native coronary ostium and the right native coronary ostium using a trained native coronary ostium detector comprises, for each of the left and right native coronary ostia:
determining a detection score for each of a plurality of voxels within a certain range of the detected location of the native coronary ostium using the trained native coronary ostium detector;
selecting one of the plurality of voxels having a highest detection score as the location of the native coronary ostium.

9. The method of claim 1, wherein the step of locally refining the location of each of the left native coronary ostium and the right native coronary ostium using a trained native coronary ostium detector comprises, for each of the left and right native coronary ostia:
determining a detection score for each of a plurality of voxels within a certain range of the detected location of the native coronary ostium using the trained native coronary ostium detector;
selecting a predetermined number of the plurality of voxels having highest detection scores; and
determining an average position of the selected voxels having the highest detection scores as the location of the native coronary ostium.

10. The method of claim 1, further comprising:
segmenting an ascending aorta surface mesh in the 3D volume; and
detecting one of more bypass coronary ostia in the 3D volume based on the segmented ascending aorta surface mesh.

11. The method of claim 10, wherein the step of segmenting an ascending aorta surface mesh in the 3D volume comprises:
detecting an aortic root in the 3D volume based on the detected locations of the left and right native coronary ostia;
tracking a centerline of the ascending aorta from the aortic root in the 3D volume; and
generating a tubular surface mesh based on the tracked centerline of the ascending aorta.

12. The method of claim 11, wherein the step of segmenting an ascending aorta surface mesh in the 3D volume further comprises:
refining a boundary of the segmented ascending aorta surface mesh using trained boundary detector to adjust each point on the tubular surface mesh.

13. The method of claim 12, wherein the step of segmenting an ascending aorta surface mesh in the 3D volume further comprises:
smoothing the refined boundary of the segmented ascending aorta surface mesh.

14. The method of claim 11, wherein said step of tracking a centerline of the ascending aorta from the aortic root in the 3D volume:
detecting, on a slice by slice basis starting at the aortic root and moving upward in the 3D volume, an aortic circle representing an intersection of the ascending aorta and a current slice using a trained 2D circle detector.

15. The method of claim 10, wherein the step of detecting one of more bypass coronary ostia in the 3D volume based on the segmented ascending aorta surface mesh comprises:
resampling the ascending aorta surface mesh to a predetermined resolution;
determining a search region comprising a plurality of mesh points on the resampled ascending aorta surface mesh based on a distribution of annotated bypass coronary ostia in a set of training volumes;
calculating a sampling score for each of the plurality of mesh points in the search region based on the distribution of the annotated bypass coronary ostia in the set of training volumes;
calculating a classification score for each of the plurality of mesh points in the search region using a trained bypass coronary ostia classifier;
calculating a probability score for each of the plurality of mesh points in the search region based on the sampling score and the classification score; and
detecting the one or more bypass coronary ostia based on the probability scores of the plurality of mesh points in the search region.

16. The method of claim 15, wherein the step of determining a search region comprising a plurality of mesh points on the resampled ascending aorta surface mesh based on a distribution of bypass coronary ostia in a set of training volumes comprises:
determining, for each of the annotated bypass coronary ostia in each of the training volumes, a closest mesh point on the resampled ascending aorta surface mesh;
increasing a hit count by one for the closest mesh point determined for each of the annotated bypass coronary ostia in each of the training volumes;
increasing a hit count by one for mesh points on the resampled ascending aorta surface mesh within an n-order neighborhood of the closest mesh point determined for each of the annotated bypass coronary ostia in each of the training volumes; and
generating the plurality of mesh points in the search region as all mesh points of the resampled ascending aorta surface mesh having a hit count greater than or equal to one.

17. The method of claim 16, wherein the step of calculating a sampling score for each of the plurality of mesh points in the search region based on the distribution of the annotated bypass coronary ostia in the set of training volumes comprises:

calculating a priori distribution of the annotated bypass coronary ostia at each of the plurality of mesh points in the search region as the hit count for the mesh point divided by the number of training volumes; and calculating the sampling score for each of the plurality of mesh points in the search region as the priori distribution for the mesh point divided by the maximum priori distribution for the plurality of mesh points in the search region.

18. The method of claim 15, wherein the step of detecting the one or more bypass coronary ostia based on the probability scores of the plurality of mesh points in the search region comprises:

detecting bypass coronary ostia candidates as ones of the plurality of mesh points in the search region having a probability score greater than a threshold;

clustering the bypass coronary ostia candidates using connected component analysis; and detected one or more bypass coronary ostia by selecting one or more clusters having above a predetermined number of clustered bypass coronary ostia candidates.

19. A method of detecting one or more bypass coronary ostia in a 3D volume comprising:

segmenting an ascending aorta surface mesh in the 3D volume;

generating a search region comprising a plurality of mesh points of the ascending aorta surface mesh based on a distribution of annotated bypass coronary ostia in a plurality of training volumes; and detecting the one or more bypass coronary ostia by searching the plurality of mesh points in the search region.

20. The method of claim 19, wherein the search region corresponds to an anterior portion of the ascending aorta surface mesh.

21. The method of claim 19, further comprising:

resampling the ascending aorta surface mesh to a predetermined resolution prior to the step of generating a search region.

22. The method of claim 19, wherein the step of generating a search region comprising a plurality of mesh points of the ascending aorta surface mesh based on a distribution of annotated bypass coronary ostia in a plurality of training volumes comprises:

determining, for each of the annotated bypass coronary ostia in the plurality of training volumes, a closest mesh point on the ascending aorta surface mesh;

increasing a hit count by one for the closest mesh point determined for each of the annotated bypass coronary ostia in the plurality of training volumes;

increasing a hit count by one for mesh points on the ascending aorta surface mesh within an n-order neighborhood of the closest mesh point determined for each of the annotated bypass coronary ostia in the plurality of training volumes; and generating the plurality of mesh points in the search region as all mesh points of the ascending aorta surface mesh having a hit count greater than or equal to one.

23. The method of claim 19, wherein the step of detecting the one or more bypass coronary ostia by searching the plurality of mesh points in the search region comprises:

calculating a sampling score for each of the plurality of mesh points in the search region based on the distribution of the annotated bypass coronary ostia in the plurality of training volumes;

calculating a classification score for each of the plurality of mesh points in the search region using a trained bypass coronary ostia classifier;

calculating a probability score for each of the plurality of mesh points in the search region based on the sampling score and the classification score; and detecting the one or more bypass coronary ostia based on the probability scores of the plurality of mesh points in the search region.

24. The method of claim 23, wherein the step of calculating a sampling score for each of the plurality of mesh points in the search region based on the distribution of the annotated bypass coronary ostia in the plurality of training volumes comprises:

calculating the sampling score as a normalized priori distribution of the annotated bypass coronary ostia in the plurality of training volumes for each of the plurality of mesh points.

25. The method of claim 23, wherein the step of detecting the one or more bypass coronary ostia based on the probability scores of the plurality of mesh points in the search region comprises:

detecting bypass coronary ostia candidates as ones of the plurality of mesh points in the search region having a probability score greater than a threshold;

clustering the bypass coronary ostia candidates using connected component analysis; and detected one or more bypass coronary ostia by selecting one or more clusters having above a predetermined number of clustered bypass coronary ostia candidates.

26. An apparatus for detecting coronary ostia in a 3D volume, comprising:

means for detecting a bounding box defining locations of a left native coronary ostium and a right native coronary ostium in the 3D volume using marginal space learning (MSL); and means for locally refining the location of each of the left native coronary ostium and the right native coronary ostium using a trained native coronary ostium detector.

27. The apparatus of claim 26, wherein the bounding box comprises a cube having a side aligned with a direction connecting the left and right native coronary ostia, with the left and right native coronary ostia located at the center of opposite faces of the cube.

28. The apparatus of claim 26, wherein the means for detecting a bounding box defining locations of a left native coronary ostium and a right native coronary ostium in the 3D volume using marginal space learning (MSL) comprises:

means for generating a low-resolution volume from the 3D volume;

means for detecting the bounding box in the low-resolution 3D volume; and means for mapping the detected bounding box back to the 3D volume at an original resolution of the 3D volume to estimate the locations of the left native coronary ostium and the right native coronary ostium in the 3D volume.

29. The apparatus of claim 28, wherein the means for locally refining the location of each of the left native coronary ostium and the right native coronary ostium using a trained native coronary ostium detector comprises:

means for locally refining the estimated locations of the left native coronary ostium and the right native coronary ostium in the 3D volume at the original resolution using the trained native coronary ostium detector.

30. The apparatus of claim 26, further comprising:
means for segmenting an ascending aorta surface mesh in the 3D volume; and
means for detecting one of more bypass coronary ostia in the 3D volume based on the segmented ascending aorta surface mesh.

31. The apparatus of claim 30, wherein the means for segmenting an ascending aorta surface mesh in the 3D volume comprises:
means for detecting an aortic root in the 3D volume based on the detected locations of the left and right native coronary ostia;
means for tracking a centerline of the ascending aorta from the aortic root in the 3D volume; and
means for generating a tubular surface mesh based on the tracked centerline of the ascending aorta.

32. The apparatus of claim 30, wherein the means for detecting one of more bypass coronary ostia in the 3D volume based on the segmented ascending aorta surface mesh comprises:
means for resampling the ascending aorta surface mesh to a predetermined resolution;
means for determining a search region comprising a plurality of mesh points on the resampled ascending aorta surface mesh based on a distribution of annotated bypass coronary ostia in a set of training volumes;
means for calculating a sampling score for each of the plurality of mesh points in the search region based on the distribution of the annotated bypass coronary ostia in the set of training volumes;
means for calculating a classification score for each of the plurality of mesh points in the search region using a trained bypass coronary ostia classifier;
means for calculating a probability score for each of the plurality of mesh points in the search region based on the sampling score and the classification score; and
means for detecting the one or more bypass coronary ostia based on the probability scores of the plurality of mesh points in the search region.

33. The apparatus of claim 32, wherein the means for determining a search region comprising a plurality of mesh points on the resampled ascending aorta surface mesh based on a distribution of bypass coronary ostia in a set of training volumes comprises:
means for determining, for each of the annotated bypass coronary ostia in each of the training volumes, a closest mesh point on the resampled ascending aorta surface mesh;
means for increasing a hit count by one for the closest mesh point determined for each of the annotated bypass coronary ostia in each of the training volumes;
means for increasing a hit count by one for mesh points on the resampled ascending aorta surface mesh within an n-order neighborhood of the closest mesh point determined for each of the annotated bypass coronary ostia in each of the training volumes; and
means for generating the plurality of mesh points in the search region as all mesh points of the resampled ascending aorta surface mesh having a hit count greater than or equal to one.

34. The apparatus of claim 33, wherein the means for calculating a sampling score for each of the plurality of mesh points in the search region based on the distribution of the annotated bypass coronary ostia in the set of training volumes comprises:
means for calculating a priori distribution of the annotated bypass coronary ostia at each of the plurality of mesh points in the search region as the hit count for the mesh point divided by the number of training volumes; and
means for calculating the sampling score for each of the plurality of mesh points in the search region as the priori distribution for the mesh point divided by the maximum priori distribution for the plurality of mesh points in the search region.

35. The apparatus of claim 32, wherein the means for detecting the one or more bypass coronary ostia based on the probability scores of the plurality of mesh points in the search region comprises:
means for detecting bypass coronary ostia candidates as ones of the plurality of mesh points in the search region having a probability score greater than a threshold;
means for clustering the bypass coronary ostia candidates using connected component analysis; and
means for detected one or more bypass coronary ostia by selecting one or more clusters having above a predetermined number of clustered bypass coronary ostia candidates.

36. An apparatus for detecting one or more bypass coronary ostia in a 3D volume comprising:
means for segmenting an ascending aorta surface mesh in the 3D volume;
means for generating a search region comprising a plurality of mesh points of the ascending aorta surface mesh based on a distribution of annotated bypass coronary ostia in a plurality of training volumes; and
means for detecting the one or more bypass coronary ostia by searching the plurality of mesh points in the search region.

37. The apparatus of claim 36, further comprising:
means for resampling the ascending aorta surface mesh to a predetermined resolution prior to generating a search region.

38. The apparatus of claim 36, wherein the means for generating a search region comprising a plurality of mesh points of the ascending aorta surface mesh based on a distribution of annotated bypass coronary ostia in a plurality of training volumes comprises:
means for determining, for each of the annotated bypass coronary ostia in the plurality of training volumes, a closest mesh point on the ascending aorta surface mesh;
means for increasing a hit count by one for the closest mesh point determined for each of the annotated bypass coronary ostia in the plurality of training volumes;
means for increasing a hit count by one for mesh points on the ascending aorta surface mesh within an n-order neighborhood of the closest mesh point determined for each of the annotated bypass coronary ostia in the plurality of training volumes; and
means for generating the plurality of mesh points in the search region as all mesh points of the ascending aorta surface mesh having a hit count greater than or equal to one.

39. The apparatus of claim 36, wherein the means for detecting the one or more bypass coronary ostia by searching the plurality of mesh points in the search region comprises:
means for calculating a sampling score for each of the plurality of mesh points in the search region based on the distribution of the annotated bypass coronary ostia in the plurality of training volumes;
means for calculating a classification score for each of the plurality of mesh points in the search region using a trained bypass coronary ostia classifier;

means for calculating a probability score for each of the plurality of mesh points in the search region based on the sampling score and the classification score; and means for detecting the one or more bypass coronary ostia based on the probability scores of the plurality of mesh points in the search region.

40. The apparatus of claim 39, wherein the means for detecting the one or more bypass coronary ostia based on the probability scores of the plurality of mesh points in the search region comprises:

means for detecting bypass coronary ostia candidates as ones of the plurality of mesh points in the search region having a probability score greater than a threshold;

means for clustering the bypass coronary ostia candidates using connected component analysis; and means for detected one or more bypass coronary ostia by selecting one or more clusters having above a predetermined number of clustered bypass coronary ostia candidates.

41. A non-transitory computer readable medium encoded with computer executable instructions for detecting coronary ostia in a 3D volume, the computer executable instructions defining steps comprising:

detecting a bounding box defining locations of a left native coronary ostium and a right native coronary ostium in the 3D volume using marginal space learning (MSL); and locally refining the location of each of the left native coronary ostium and the right native coronary ostium using a trained native coronary ostium detector.

42. The non-transitory computer readable medium of claim 41, wherein the bounding box comprises a cube having a side aligned with a direction connecting the left and right native coronary ostia, with the left and right native coronary ostia located at the center of opposite faces of the cube.

43. The non-transitory computer readable medium of claim 41, wherein the computer executable instructions defining the step of detecting a bounding box defining locations of a left native coronary ostium and a right native coronary ostium in the 3D volume using marginal space learning (MSL) comprise computer executable instructions defining the steps of:

generating a low-resolution volume from the 3D volume;

detecting the bounding box in the low-resolution 3D volume; and mapping the detected bounding box back to the 3D volume at an original resolution of the 3D volume to estimate the locations of the left native coronary ostium and the right native coronary ostium in the 3D volume.

44. The non-transitory computer readable medium of claim 43, wherein the computer executable instructions defining the step of locally refining the location of each of the left native coronary ostium and the right native coronary ostium using a trained native coronary ostium detector comprise computer executable instructions defining the step of:

locally refining the estimated locations of the left native coronary ostium and the right native coronary ostium in the 3D volume at the original resolution using the trained native coronary ostium detector.

45. The non-transitory computer readable medium of claim 41, further comprising computer executable instructions defining the steps of:

segmenting an ascending aorta surface mesh in the 3D volume; and detecting one of more bypass coronary ostia in the 3D volume based on the segmented ascending aorta surface mesh.

46. The non-transitory computer readable medium of claim 45, wherein the computer executable instructions defining the step of segmenting an ascending aorta surface mesh in the 3D volume comprise computer executable instructions defining the steps of:

detecting an aortic root in the 3D volume based on the detected locations of the left and right native coronary ostia;

tracking a centerline of the ascending aorta from the aortic root in the 3D volume; and generating a tubular surface mesh based on the tracked centerline of the ascending aorta.

47. The non-transitory computer readable medium of claim 45, wherein the computer executable instructions defining the step of detecting one of more bypass coronary ostia in the 3D volume based on the segmented ascending aorta surface mesh comprise computer executable instructions defining the steps of:

resampling the ascending aorta surface mesh to a predetermined resolution;

determining a search region comprising a plurality of mesh points on the resampled ascending aorta surface mesh based on a distribution of annotated bypass coronary ostia in a set of training volumes;

calculating a sampling score for each of the plurality of mesh points in the search region based on the distribution of the annotated bypass coronary ostia in the set of training volumes;

calculating a classification score for each of the plurality of mesh points in the search region using a trained bypass coronary ostia classifier;

calculating a probability score for each of the plurality of mesh points in the search region based on the sampling score and the classification score; and detecting the one or more bypass coronary ostia based on the probability scores of the plurality of mesh points in the search region.

48. The non-transitory computer readable medium of claim 47, wherein the computer executable instructions defining the step of determining a search region comprising a plurality of mesh points on the resampled ascending aorta surface mesh based on a distribution of bypass coronary ostia in a set of training volumes comprise computer executable instructions defining the steps of:

determining, for each of the annotated bypass coronary ostia in each of the training volumes, a closest mesh point on the resampled ascending aorta surface mesh;

increasing a hit count by one for the closest mesh point determined for each of the annotated bypass coronary ostia in each of the training volumes;

increasing a hit count by one for mesh points on the resampled ascending aorta surface mesh within an n-order neighborhood of the closest mesh point determined for each of the annotated bypass coronary ostia in each of the training volumes; and generating the plurality of mesh points in the search region as all mesh points of the resampled ascending aorta surface mesh having a hit count greater than or equal to one.

49. The non-transitory computer readable medium of claim 48, wherein the computer executable instructions defining the step of calculating a sampling score for each of the plurality of mesh points in the search region based on the distribution of the annotated bypass coronary ostia in the set of training volumes comprise computer executable instructions defining the steps of:

calculating a priori distribution of the annotated bypass coronary ostia at each of the plurality of mesh points in the search region as the hit count for the mesh point divided by the number of training volumes; and calculating the sampling score for each of the plurality of mesh points in the search region as the priori distribution for the mesh point divided by the maximum priori distribution for the plurality of mesh points in the search region.

50. The non-transitory computer readable medium of claim 47, wherein the computer executable instructions defining the step of detecting the one or more bypass coronary ostia based on the probability scores of the plurality of mesh points in the search region comprise computer executable instructions defining the steps of:

detecting bypass coronary ostia candidates as ones of the plurality of mesh points in the search region having a probability score greater than a threshold;

clustering the bypass coronary ostia candidates using connected component analysis; and detected one or more bypass coronary ostia by selecting one or more clusters having above a predetermined number of clustered bypass coronary ostia candidates.

51. A non-transitory computer readable medium encoded with computer executable instructions for detecting one or more bypass coronary ostia in a 3D volume, the computer executable instructions defining steps comprising:

segmenting an ascending aorta surface mesh in the 3D volume;

generating a search region comprising a plurality of mesh points of the ascending aorta surface mesh based on a distribution of annotated bypass coronary ostia in a plurality of training volumes; and detecting the one or more bypass coronary ostia by searching the plurality of mesh points in the search region.

52. The non-transitory computer readable medium of claim 51, further comprising computer executable instructions defining the step of:

resampling the ascending aorta surface mesh to a predetermined resolution prior to the step of generating a search region.

53. The non-transitory computer readable medium of claim 51, wherein the computer executable instructions defining the step of generating a search region comprising a plurality of mesh points of the ascending aorta surface mesh based on a distribution of annotated bypass coronary ostia in a plurality of training volumes comprise computer executable instructions defining the steps of:

determining, for each of the annotated bypass coronary ostia in the plurality of training volumes, a closest mesh point on the ascending aorta surface mesh;

increasing a hit count by one for the closest mesh point determined for each of the annotated bypass coronary ostia in the plurality of training volumes;

increasing a hit count by one for mesh points on the ascending aorta surface mesh within an n-order neighborhood of the closest mesh point determined for each of the annotated bypass coronary ostia in the plurality of training volumes; and generating the plurality of mesh points in the search region as all mesh points of the ascending aorta surface mesh having a hit count greater than or equal to one.

54. The non-transitory computer readable medium of claim 51, wherein the computer executable instructions defining the step of detecting the one or more bypass coronary ostia by searching the plurality of mesh points in the search region comprise computer executable instructions defining the steps of:

calculating a sampling score for each of the plurality of mesh points in the search region based on the distribution of the annotated bypass coronary ostia in the plurality of training volumes;

calculating a classification score for each of the plurality of mesh points in the search region using a trained bypass coronary ostia classifier;

calculating a probability score for each of the plurality of mesh points in the search region based on the sampling score and the classification score; and detecting the one or more bypass coronary ostia based on the probability scores of the plurality of mesh points in the search region.

55. The non-transitory computer readable medium of claim 54, wherein the computer executable instructions defining the step of detecting the one or more bypass coronary ostia based on the probability scores of the plurality of mesh points in the search region comprise computer executable instructions defining the steps of:

detecting bypass coronary ostia candidates as ones of the plurality of mesh points in the search region having a probability score greater than a threshold;

clustering the bypass coronary ostia candidates using connected component analysis; and detected one or more bypass coronary ostia by selecting one or more clusters having above a predetermined number of clustered bypass coronary ostia candidates.

* * * * *